United States Patent Office 3,086,005
Patented Apr. 16, 1963

3,086,005
NOVEL CHEMICAL COMPOUNDS AND THE SYNTHETIC PREPARATIONS THEREOF
Elbert M. Idelson, Brookline, Mass., assignor to Polaroid Corporation, Cambridge, Mass., a corporation of Delaware
No Drawing. Filed Jan. 26, 1959, Ser. No. 788,745
18 Claims. (Cl. 260—202)

This invention relates to chemistry and more particularly to novel chemical compounds and the synthetic preparations thereof.

A principal object of the present invention is to provide novel azo dyes.

Another object of the present invention is to provide novel syntheses for preparing certain novel azo dyes.

A further object of the present invention is to provide novel syntheses for certain photographic azo dyes disclosed and claimed in the copending U.S. application of Howard G. Rogers and Martin E. Idelson, Serial No. 788,892, filed concurrently herewith.

A still further object of the present invention is to provide novel methods for selectively acylating certain azo dyes, that is, acylating one or more hydroxyl groups substituted on aryl nuclei in ortho and/or ortho' positions to one or more azo groups, wherein said dyes contain at least one dihydroxyphenyl constituent component.

Other objects of this invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

This invention is concerned with the preparation of certain azo dyes comprising mono- and disazo dyes characterized in that said dyes contain not less than one and not more than two groups selected from the groups represented by the formulae:

(1)

(2)
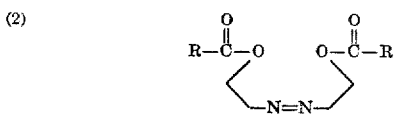

wherein each R is an alkyl group, preferably a lower alkyl group comprising from one to five carbon atoms, inclusive, such as methyl, ethyl, propyl, etc., or a chloroalkyl group, such as $ClCH_2$—; and said dyes being further characterized in that they contain not less than one and not more than two groups selected from the group consisting of p-dihydroxyphenyl, o-dihydroxyphenyl, p-quinone, and o-quinone groups and the halogen and alkyl substituted derivatives thereof.

It will be apparent that the aforementioned mono- and disazo dyes may also be represented by the formulae:

(3)
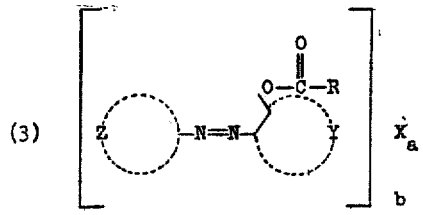

(4)
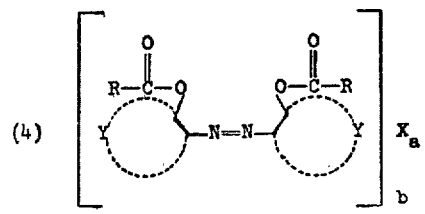

(5)
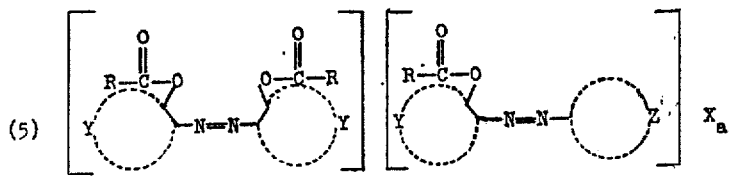

wherein each R has the same significance as previously noted; X is a p-quinone, an o-quinone, a p-dihydroxyphenyl, or an o-dihydroxyphenyl group and the halogen and alkyl substituted derivatives thereof; $a$ and $b$ each may be the same or different and are 1 or 2; each Y represents the nonmetallic atoms necessary to complete an aryl nucleus which may be substituted or unsubstituted and may be the same or different, preferably a benzene or naphthalene nucleus; and Z is the residue of an azo coupler.

It has been discovered that compounds within the aforementioned formulae may be prepared by oxidizing to the quinone the p-dihydroxyphenyl or o-dihydroxyphenyl groups or derivatives thereof of mono- or disazo dyes characterized in that said dyes contain not less than one and not more than two ortho-hydroxyazo and/or ortho,ortho'-dihydroxyazo configurations and said dyes being further characterized in that they contain not less than one and not more than two groups selected from the group consisting of p-dihydroxyphenyl and o-dihydroxyphenyl groups and the halogen and alkyl substituted derivatives thereof, said oxidation being accomplished, for example, with an oxidizing agent such as benzoquinone, chloranil, etc.; acylating the hydroxyl groups substituted ortho and/or ortho' to one or more azo groups by reacting the oxidation product with an acylating agent, preferably an enol ester, especially an enol ester of the formula:

(6)
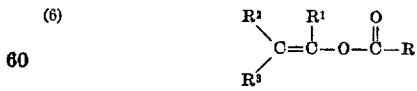

wherein $R^2$ and $R^3$ each may be the same or different and are hydrogen or an alkyl group, such as $CH_3$—, $C_2H_5$—, etc.; $R^1$ is hydrogen, an alkyl group, such as $CH_3$—, $n$—$C_4H_9$, $n$—$C_5H_{11}$, etc., an alkenyl group, such as

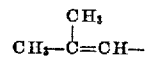

or an aryl group, such as phenyl; and R is an alkyl group, such as $CH_3$—, or a chloroalkyl group, such as $ClCH_2$—; said acylation preferably being accomplished either utilizing a compound of Formula 6 as the solvent medium or in an inert solvent such as methylene chloride, ethyl acetate, etc., in the presence of a suitable catalyst such as a strong inorganic acid, for example, concentrated perchloric, sulfuric, etc., acids; and regenerating the p-dihydroxyphenyl or o-dihydroxyphenyl groups or derivatives thereof by reduction, said reduction being accomplished, for example, with a reducing agent such as xylohydroquinone or hydrogen in the presence of a suitable catalyst such as a palladium/charcoal catalyst.

It is contemplated within the scope of this invention that, where desirable, the dyes may contain one or more hydroxyl groups substituted thereon in addition to those previously mentioned. Under such conditions, the acylation action may be continued until substantially complete acylation is attained, that is, acylation of each free hydroxyl group of the respective dye molecules.

As illustrative examples of the preferred enol ester acylating agents within Formula 6 deemed suitable for utilization in the practice of this invention, mention may be made of:

1-propen-2-ol acetate,
2-buten-2-ol acetate,
4-methyl-1,3-pentadiene-2-ol acetate,
1-phenylethanol acetate,
4-methyl-2-penten-2-ol acetate,
2-hepten-2-ol acetate,
2-octen-2-ol acetate,
2,6-dimethyl-4-hepten-4-ol acetate,
Vinyl acetate,
1-hexen-2-ol acetate,
1-hepten-2-ol acetate,
1-hexen-2-ol-chloroacetate,
etc.

As examples of ortho-hydroxy and/or ortho,ortho'-dihydroxy substituted mono- and disazo dyes preferred for use in the practice of the present invention, mention may be made of the following:

2-(4'-[4''-(2''',5''' - dihydroxyphenethyl) - phenylazo]- naphthaleneazo)-4-methoxy-1-naphthol,
p-(1-hydroxy-4-methoxy-2 - naphthaleneazo) - phenethylcatechol,
2-(p-[β-(hydroquinonyl)-ethyl]-phenylazo)-4 - methoxy-1-naphthol,
2-(p-[β-(hydroquinonyl)-ethyl]-phenylazo)-4-n-propoxy-1-naphthol, the preparations of which are disclosed in the copending U.S. application of Elkan R. Blout, Milton Green, and Howard G. Rogers, Serial No. 612,045, filed September 25, 1956;

2-(2',5'-dimethoxy-4-[p-(2'',5''-dihydroxyphenyl) - phenylazo]-phenylazo)-4-methoxy-1-naphthol, the preparation of which is disclosed in the copending U.S. application of Helen P. Husek and Myron S. Simon, Serial No. 612,054, filed September 25, 1956;

2-(2',5'-dimethoxy-4'-[p - (2'',5'' - dihydroxyphenethyl)-phenylazo]-phenylazo)-4-methoxy-1-naphthol, the preparation of which is disclosed in the copending U.S. application of Helen P. Husek, Serial No. 612,055, filed September 25, 1956;

2-(p-[4'-methyl-2'5'-dihydroxyphenylthioethyl) - phenylazo]-4-methoxy-1-naphthol, the preparation of which is disclosed in the copending U.S. application of Milton Green and Howard G. Rogers, Serial No. 663,905, filed June 6, 1957;

2-(p-[2',5'-dihydroxyphenoxy]-phenylazo)-4-methoxy - 1-naphthol, the preparation of which is disclosed in the copending U.S. application of Milton Green, Serial No. 680,403, filed August 26, 1957;

2-(p-[hydroquinonylsulfonyl]-phenylazo)-4-methoxy - 1-naphthol, the preparation of which is disclosed in the copending U.S. application of Milton Green, Serial No. 680,434, filed August 26, 1957;

2-(2',5'-dimethoxy-3'-[2''-(2''',5''' - dihydroxybenzoyl)-ethyl]-phenylazo)-4-methoxy-1-naphthol, the preparation of which is disclosed in the copending U.S. application of Elkan R. Blout, Milton Green, Howard G. Rogers, and Myron S. Simon, Serial No. 685,081, filed September 20, 1957;

4,4'-bis-(4''-[2''',5''' - dihydroxyphenethyl] - phenylsulfamyl)-1'-hydroxy-1,2'-azonaphthalene,
4-(4'-[2'',5''-dihydroxyphenethyl]-N-methyl - phenylsulfamyl)-2-(2',5'-dimethoxyphenylazo)-1-naphthol, the preparations of which are disclosed in the copending U.S. application of Elkan R. Blout, Milton Green, Howard G. Rogers, and Robert B. Woodward, Serial No. 707,109, filed January 6, 1958;

2-(4'-[p-(hydroquinonyl)-phenylcarboxamido] - phenylazo)-4-methoxy-1-naphthol, the preparation of which is disclosed in the copending U.S. application of Milton Green, Serial No. 703,515, filed December 18, 1957;

2-(4'-[4'' - (2''',5''' - dihydroxyphenethyl) - phenylcarbamyl]-phenylazo)-4-methoxy-1-naphthol, the preparation of which is disclosed in the copending U.S. application of Milton Green and Howard G. Rogers, Serial No. 748,145, filed July 14, 1958; and 1-(4'-[2'',5''-dihydroxyphenethyl]-2' - hydroxy - phenylazo)-2-naphthol, the preparation of which is disclosed in the copending U.S. application of Milton Green and Myron S. Simon, Serial No. 788,893, filed concurrently herewith.

This invention will be illustrated in greater detail in conjunction with the following specific examples which set out representative applications of the novel processes of this invention, which, however, are not limited to the details therein set forth and are intended to be illustrative only.

*Example 1*

10 grams of 2-(p-[β-(hydroquinonyl)-ethyl]-phenylazo)-4-methoxy-1-naphthol, the preparation of which is disclosed in the aforementioned copending U.S. application, Serial No. 612,045, and 10.5 grams of benzoquinone are refluxed for 3.5 hours in 150 cc. of chloroform to provide 3 grams of

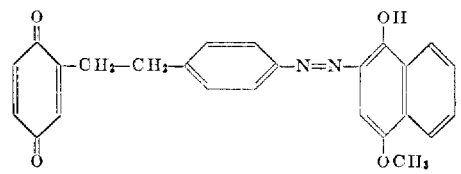

4-methoxy-2-(p-[β-(p'-quinonyl)-ethyl] - phenylazo) - 1-naphthol.

*Example 2*

8 grams of 4-methoxy-2-(p-[β-(p'-quinonyl)-ethyl]-phenylazo)-1-naphthol and 25 grams of 1-propen-2-ol acetate are dissolved in 100 cc. of ethyl acetate. 2 drops of concentrated sulfuric acid are added and the resultant solution refluxed for 2.5 hours. The solution is then filtered through sodium bicarbonate and the filtrate is diluted with two volumes of hexane. The product is crystallized at 5° C. and collected by filtration.

The resultant product:

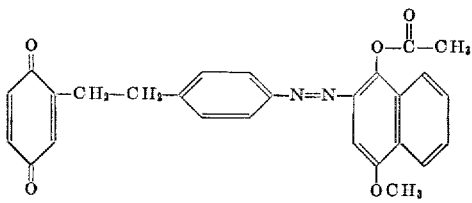

1-acetoxy-4-methoxy-2-(p-[β-(p'-quinonyl)-ethyl] - phenylazo)-naphthalene, exhibits a spectral absorption curve which displays a λ$_{max.}$ at 396 mμ in acetone; ε=6,800.

*Example 3*

0.3 gram of 1-acetoxy-4-methoxy-2-(p-[β-(p'-quinonyl)-ethyl]-phenylazo)-naphthalene is dissolved in 15 cc. of chloroform and reduced with 0.3 gram of 2,5-xylohydroquinone.

The resultant product:

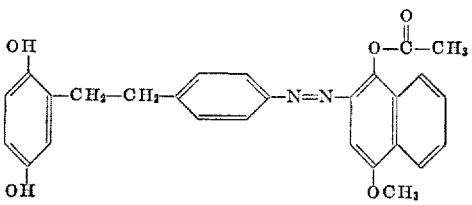

1-acetoxy-2-(p-[β-(hydroquinonyl)-ethyl]-phenylazo) - 4-methoxy-naphthalene is separated and purified by chromatographing on acetic acid washed alumina. The purified product exhibits a spectral absorption curve which displays a λ$_{max.}$ at 390 mμ in acetone; ε=6,700.

*Example 4*

1-acetoxy-4-methoxy-2-(p-[β-(p' - quinonyl) - ethyl]-phenylazo)-naphthalene is reduced by dissolving 2 grams in 25 cc. of ethyl acetate, adding 0.5 gram of a 10% palladium/carbon catalyst and treating with hydrogen under 1 atmosphere pressure. After substantially complete reaction, that is, absorption of 1 mole of hydrogen, the solvent is removed by evaporation and the residue, 1-acetoxy-2-(p-[β-(hydroquinonyl)-ethyl]-phenylazo) - 4-methoxy-naphthalene, exhibits a spectral absorption curve identical with the spectral absorption curve of the product of Example 3, displaying a λ$_{max.}$ at 390 mμ in acetone; ε=6,700.

*Example 5*

5 grams of 2-(p-[β-(hydroquinonyl)-ethyl]-phenylazo)-4-n-propoxy-1-naphthol, the preparation of which is disclosed in the aforementioned copending U.S. application Serial No. 612,045, and 6 grams of benzoquinone are refluxed for 3.5 hours in 200 cc. of chloroform to provide 3.3 grams of

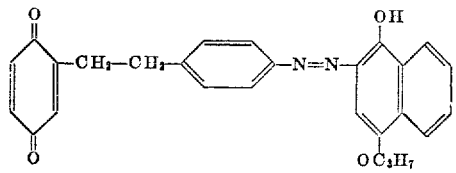

4-n-propoxy-2-(p-[β-(p'-quinonyl)-ethyl]-phenylazo) - 1-naphthol.

*Example 6*

3.0 grams (0.0062 mole) of 4-n-propoxy-2-(p-[β-(p'-quinonyl)-ethyl]-phenylazo)-1-naphthol and 15 cc. of 1-propen-2-ol acetate are dissolved in 200 cc. of methylene chloride. 5 drops of concentrated sulfuric acid are added and the resulting solution refluxed for 2 hours. After cooling, the solution is poured into 200 cc. of ligroin, the product crystallized at approximately 5° C. for 24 hours and collected by filtration.

The resultant product:

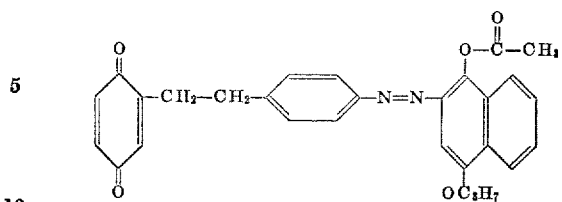

1-acetoxy - 4 - n - propoxy - 2 - (p - [β - (p' - quinonyl)-ethyl]-phenylazo)naphthalene, exhibits a spectral absorption curve which displays a λ$_{max.}$ at 396 mμ in acetone; ε=6,800.

*Example 7*

3 grams of 1-acetoxy-4-n-propoxy-2-(p-[β-(p'-quinonyl)-ethyl]-phenylazo)-naphthalene are dissolved in 50 cc. of ethyl acetate and reduced by refluxing the solution with 3 grams of 2,5-xylohydroquinone for 3 hours. After substantially complete reaction, the solution is filtered and the product purified by chromatographing an acetic acid washed alumina.

The resultant product:

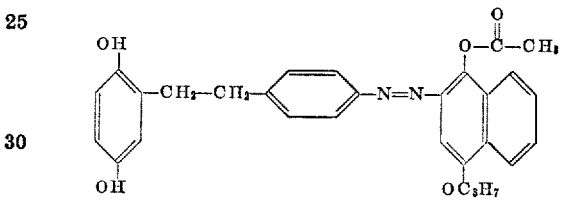

1 - acetoxy - 2 - (p - [β - (hydroquinonyl) - ethyl] - phenylazo)-4-n-propoxynaphthalene, exhibits a spectral absorption curve which displays a λ$_{max.}$ at 390 mμ in acetone; ε=6,700.

*Example 8*

1.3 grams of 2-(p-[2',5'-dihydroxyphenoxy]-phenylazo)-4-methoxy-1-naphthol, the preparation of which is disclosed in the aforementioned copending U.S. application Serial No. 680,403, and 1.3 grams of benzoquinone are refluxed for 3.5 hours in 10 cc. of chloroform. After filtering the hot solution, the filtrate is diluted with an equal volume of liquor to provide 1.0 gram of the desired product:

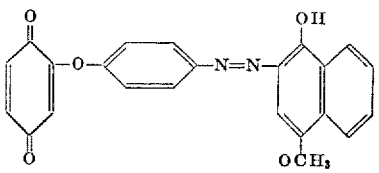

4 - methoxy - 2 - (4' - [p - quinonyloxy] - phenylazo) - 1-naphthol exhibiting a melting point at 190 to 192° C.

*Example 9*

1.0 gram of 4-methoxy-2-(p-[p'-quinonyloxy]-phenylazo)-1-naphthol and 3.5 cc. of 1-propen-2-ol acetate is dissolved in 50 cc. of methylene chloride. 6 drops of concentrated sulfuric acid are added to the solution. After the initial reaction, the solution is warmed for 15 minutes and then poured into a separatory funnel, washed with water and then washed with a saturated sodium bicarbonate solution. The resultant solution is dried over anhydrous magnesium sulfate. The solvents are removed in vacuo and the residual oil,

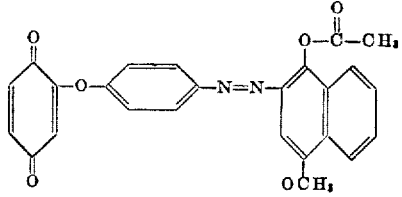

1 - acetoxy - 4 - methoxy - 2(4' - [p - quinonyloxy]-phenylazo)-naphthalene, is dissolved in 15 cc. of ethyl acetate.

*Example 10*

The product of Example 9 is reduced by adding 0.5 gram of a 10% palladium/carbon catalyst and treating with hydrogen under 1 atmosphere pressure. After substantially complete reaction, the solvent is removed by evaporation, and the product is stirred with 5 cc. of methylene chloride and separated by filtration.

The resultant product:

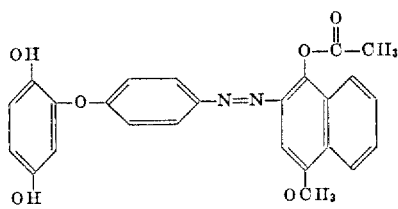

1 - acetoxy - 2 - (p-[2',5'-dihydroxyphenoxy]-phenylazo)-4-methoxy-naphthalene, exhibits a spectral absorption curve which displays a $\lambda_{max.}$ at 409 m$\mu$ in acetone; $\epsilon=9,100$ and a $\lambda_{max.}$ at 389 m$\mu$ in acetone; $\epsilon=9,700$.

Substitution of appropriate starting materials in the aforementioned examples, such as substituting one or more of the previously enumerated ortho-hydroxy and/or ortho, ortho'-dihydroxyazo dyes and/or one or more of the previously enumerated acylating agents, provides additional compounds within the previously stated generic formulae.

As previously stated, certain acylated azo dyes, that is, mono- and disazo dyes wherein one or more hydroxyl groups substituted on aryl nuclei in ortho and/or ortho' positions to one or more azo groups are acylated and wherein said dyes contain at least one dihydroxyphenyl constituent component, are useful in photographic processes disclosed in the previously cited copending U.S. application Serial No. 788,892 and especially in the diffusion-transfer reversal processes disclosed therein, in which the optical characteristics of certain selectively acylated azo dyes are utilized to provide increased emulsion speed and enhanced absorption characteristics in monochromatic and multichromatic photographic processes.

Since certain changes may be made in the above products and processes without departing from the scope of the invention herein involved, it is intended that all matter contained in the above description shall be interpreted as illustrative and not in a limiting sense.

What is claimed is:

1. A process for preparing azo dyes which comprises the steps of oxidizing a dye selected from the group consisting of mono- and disazo dyes characterized in that said dyes contain not less than one and not more than two groups selected from the group consisting of ortho-hydroxyazo and ortho,ortho'-dihydroxyazo groups, said dyes being further characterized in that they contain not less than one and not more than two groups selected from the group consisting of p-dihydroxyphenyl and o-dihydroxyphenyl groups and the halogen and alkyl substituted derivatives thereof, to thereby provide the quinone oxidation product of said dihydroxyphenyl groups; acylating the hydroxyl groups of said ortho-hydroxyazo and said ortho,ortho'-dihydroxyazo groups of said quinone oxidation product; and then reducing the quinone oxidation product of said dihydroxyphenyl groups to provide thereby reconstitution of said dihydroxyphenyl groups.

2. A process as defined in claim 1 wherein the step of oxidizing said dye is accomplished by reacting said dye with benzoquinone.

3. A process as defined in claim 1 wherein the step of acylating said quinone oxidation product is accomplished by reacting said product with an enol ester.

4. A process as defined in claim 3 wherein the step of acylating said quinone oxidation product is accomplished in the presence of strong inorganic acid catalyst.

5. A process as defined in claim 4 wherein said catalyst is concentrated sulfuric acid.

6. A process as defined in claim 3 wherein said enol ester is 1-propen-2-ol acetate.

7. A process as defined in claim 1 wherein the step of reducing said acylated quinone oxidation product is accomplished by reacting said product with 2,5-xylohydroquinone.

8. A process as defined in claim 1 wherein the step of reducing said acylated quinone oxidation product is accomplished by reacting said product with hydrogen in the presence of a suitable catalyst.

9. A process as defined in claim 8 wherein said catalyst is a palladium/charcoal catalyst.

10. A process of preparing 1-acetoxy-2-(p-[$\beta$-(hydroquinonyl)-ethyl]-phenylazo) - 4 - methoxy - naphthalene which comprises oxidizing 2-(p-[$\beta$-(hydroquinonyl)-ethyl]-phenylazo)-4-methoxy-1-naphthol to provide 4-methoxy - 2 - (p - [$\beta$ - (quinonyl) - ethyl] - phenylazo)-1-naphthol; acylating the resultant product with 1-propen-2-ol acetate in the presence of a catalyst to provide 1-acetoxy - 4 - methoxy - 2 - (p - [$\beta$ - (quinonyl) - ethyl]-phenylazo)-naphthalene; and reducing the resultant product.

11. A process of preparing 1-acetoxy-2-(p-[$\beta$-(hydroquinonyl)-ethyl]-phenylazo) - 4 - methoxy - naphthalene which comprises oxidizing 2-(p-[$\beta$-(hydroquinonyl)-ethyl]-phenylazo)-4-methoxy-1-naphthol to provide 4-methoxy - 2 - (p - [$\beta$ - (p' - quinonyl) - ethyl]-phenylazo)-1-naphthol; acylating the resultant product with 1-propen-2-ol acetate in the presence of a catalyst to provide 1-acetoxy - 4 - methoxy - 2 - (p - [$\beta$ - (p' - quinonyl)-ethyl]-phenylazo)-naphthalene; and reducing the resultant product.

12. A process of preparing 1-acetoxy-2-(p-[$\beta$-(hydroquinonyl) - ethyl] - phenylazo) - 4 - n - propoxy-naphthalene which comprises oxidizing 2-(p-[$\beta$-(hydroquinonyl)-ethyl]-phenylazo)-4-propoxy-1-naphthol to provide 4-n-propoxy - (p - [$\beta$ - (p' - quinonyl) - ethyl] - phenylazo)-1-naphthol; acylating the resultant product with 1-propen-2-ol acetate in the presence of a catalyst to provide 1-acetoxy - 4 - n - propoxy - 2 - (p - [$\beta$ - (p' - quinonyl)-ethyl]-phenylazo)-naphthalene; and reducing the resultant product.

13. A process of preparing 1-acetoxy-2-(p-[2',5'-dihydroxyphenoxy]-phenylazo)4-methoxy-naphthalene which comprises oxidizing 2-(p-[2',5'-dihydroxyphenoxy]-phenylazo)-4-methoxy-1-naphthol to provide 4-methoxy-2-(p-[p'-quinonyloxy]-phenylazo)-1-naphthol; acylating the resultant product with 1-propen-2-ol acetate in the presence of a catalyst to provide 1-acetoxy - 4 - methoxy-2-(p-[p'-quinonyloxy]-phenylazo)-naphthalene; and reducing the resultant product.

14. A dye selected from the group consisting of mono- and disazo dyes which contain not less than one and not more than two groups of the formula:

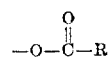

wherein R is a lower alkyl group; ortho to at least one azo group, and not more than one of said groups is ortho to the same nitrogen atom of said azo group; said dye further containing not less than one and not more than two groups selected from the group consisting of p-quinone and o-quinone groups.

15. A dye as defined in claim 14 wherein each R is a methyl group.

16. 1 - acetoxy-4-methoxy - 2 - (p - [$\beta$ - (p' - quinonyl)-ethyl]-phenylazo)-naphthalene.

17. 1 - acetoxy - 4 - n - propoxy - 2 - (p - [$\beta$ - (p'-quinonyl)-ethyl]-phenylazo)-naphthalene.

18. 1 - acetoxy - 4 - methoxy - 2 - (p-[p'-quinonyloxy]-phenylazo)-naphthalene.

References Cited in the file of this patent

UNITED STATES PATENTS 2,422,016     Hull et al. _____ June 10, 1947

OTHER REFERENCES

Fieser and Fieser, Organic Chemistry (1950), pages 751–767 (copy in Library).

UNITED STATES PATENT OFFICE
CERTIFICATE OF CORRECTION

Patent No. 3,086,005            April 16, 1963

Elbert M. Idelson

It is hereby certified that error appears in the above numbered patent requiring correction and that the said Letters Patent should read as corrected below.

Column 2, line 65, for "n-$C_4H_9$, n-$C_5H_{11}$," read -- n-$C_4H_9$-, n-$C_5H_{11}$-, --; column 8, line 44, for "-4-propoxy-1-naphthol" read -- -4-n-propoxy-1-naphthol --.

Signed and sealed this 14th day of April 1964.

(SEAL)
Attest:

ERNEST W. SWIDER
Attesting Officer

EDWARD J. BRENNER
Commissioner of Patents